(12) United States Patent
Pantzar

(10) Patent No.: US 7,625,156 B2
(45) Date of Patent: Dec. 1, 2009

(54) MILLING TOOL WITH OVERLAPPING INSERTS

(75) Inventor: Göran Pantzar, Årsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 141 days.

(21) Appl. No.: 10/582,102

(22) PCT Filed: Dec. 13, 2004

(86) PCT No.: PCT/SE2004/001853

§ 371 (c)(1),
(2), (4) Date: Apr. 16, 2007

(87) PCT Pub. No.: WO2005/058534

PCT Pub. Date: Jun. 30, 2005

(65) Prior Publication Data

US 2008/0019783 A1    Jan. 24, 2008

(30) Foreign Application Priority Data

Dec. 16, 2003    (SE) ..................................... 0303371

(51) Int. Cl.
*B23C 5/20* (2006.01)
(52) U.S. Cl. .............................. 407/34; 407/35; 407/55; 407/59
(58) Field of Classification Search ................... 407/33, 407/34, 42, 47, 51, 53, 61–63; *B23C 5/20*
See application file for complete search history.

(56) References Cited

U.S. PATENT DOCUMENTS

| 4,681,485 | A | * | 7/1987 | Koelewijn | .................... 407/42 |
| 5,083,887 | A | * | 1/1992 | Dotany | ......................... 407/59 |
| 5,913,644 | A | * | 6/1999 | DeRoche et al. | .............. 407/42 |
| 5,944,456 | A | * | 8/1999 | Shirley et al. | .................. 407/42 |
| 6,619,891 | B2 | | 9/2003 | Hansson et al. | |
| 7,134,811 | B2 | * | 11/2006 | Francis et al. | .................. 407/42 |

FOREIGN PATENT DOCUMENTS

| AU | 756749 | | 1/2003 |
| DE | 3314049 | | 10/1984 |
| EP | 0 711 619 | | 5/1996 |
| JP | 10291115 | A * | 11/1998 |
| WO | 01/83142 | | 11/2001 |

* cited by examiner

*Primary Examiner*—Boyer D Ashley
*Assistant Examiner*—Sara Addisu
(74) *Attorney, Agent, or Firm*—Drinker Biddle & Reath LLP

(57) ABSTRACT

A cylindrical cutter is disclosed of the type that includes a milling body rotatable around a geometrical axis having an envelope surface extending rearward from a end, in which surface a plurality of tangentially spaced flutes are formed, which separately includes a plurality of axially spaced-part insert pockets for releasably mounted cutting inserts, the active edges of which are partially overlapping each other, more precisely in imaginary, radially extending overlapping planes. A first insert pocket located closest to the front end, together with the appurtenant cutting insert in a first flute, has another length than the other insert pockets and the cutting inserts, respectively, in the same flute in order to axially displace said overlapping planes in relation to each other and in such a way guarantee that the machined surface always is passed by at least one entire edge, at the same time as the cutting edges of all front cutting inserts extend up to a common radial plane adjacent to the front end while forming a full effective milling cutter.

7 Claims, 1 Drawing Sheet

MILLING TOOL WITH OVERLAPPING INSERTS

TECHNICAL FIELD OF THE INVENTION

Figure 1:
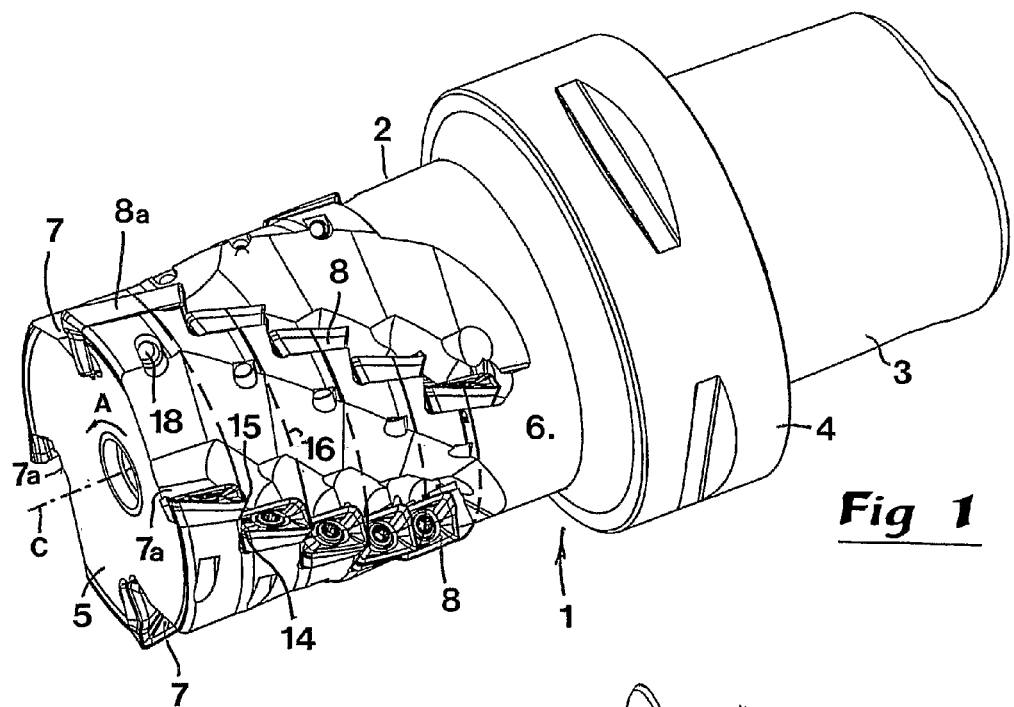

This invention relates to a milling tool of the type that comprises a milling body rotatable around a geometrical axis and having an envelope surface extending rearward from a front end, in which surface a plurality of tangentially spaced-apart flutes are formed, which separately includes a plurality of axially spaced-apart insert pockets for releasably mounted cutting inserts, the active edges of which are partially overlapping each other, more precisely in imaginary, radially extending overlapping planes.

By those skilled in the art, tools of this type are denominated cylindrical cutters or long edge milling cutters.

PRIOR ART

Usually the above-mentioned flutes for the cutting inserts and the insert pockets are helically shaped, i.e., extending from a free, front end of the milling body in a geometrical helix having a more or less marked pitch. See, for instance, WO 01/83142. The cutting inserts are formed with edges, which either are straight or helically bevelled (=helically shaped). In this respect, it is substantial that the active edges of the cutting inserts during the rotation of the tool mutually are located in an imaginary, rotationally symmetrical, for instance cylindrical or conical, surface or configuration, which generates as smooth a surface as possible in the workpiece.

In practice, cylindrical cutters may be used for a plurality of different types of chip-removing machining, e.g., edge milling, end milling, slot milling, ramping, etc. However, as regards the surface smoothness in the machined surface, the results may at times become inferior as a consequence of the ends of the cutting edges, adjacent to one or more radial overlapping planes, leaving more or less marked irregularities or breaking line-like stripes in the machined surface. Although such stripes most often have a very limited height (>0.1 mm), the same will most often be well visible in the surface and at times cause unacceptable poor machining precision. A crucial reason for such stripes at all arising in full effective cylindrical cutters is that all cutting inserts in one and the same radial plane have equally long cutting edges. This means that the corners or the ends in the same radial set of cutting inserts are located in one and the same overlapping plane. Therefore, if only one corner of one of the cutting inserts in a set of, e.g., four or six cutting inserts is erroneously located in relation to the imaginary, common cylinder surface or cone surface, a stripe is generated in the machined surface, the height of which corresponds to the misalignment of the edge corners in relation to each other.

OBJECTS AND FEATURES OF THE INVENTION

The present invention aims at obviating the above-mentioned disadvantages of previously known, full effective cylindrical cutters and at providing an improved cylindrical cutter. Therefore, an object of the invention is to provide a cylindrical cutter, the cutting inserts of which are so constructed and located that the generated surface in a workpiece will be smooth and free from annoying irregularities or stripes.

According to the invention, the above-mentioned object is attained by a first insert pocket located closest to the front end, together with the appurtenant cutting insert in a first flute, having another length than the other inset pockets and the cutting inserts, respectively, in the same flute in order to axially displace said overlapping planes in relation to the overlapping planes between the cutting inserts in a row of cutting inserts in a second, nearby flute.

BRIEF DESCRIPTION OF THE ACCOMPANYING DRAWING

Figure 2:
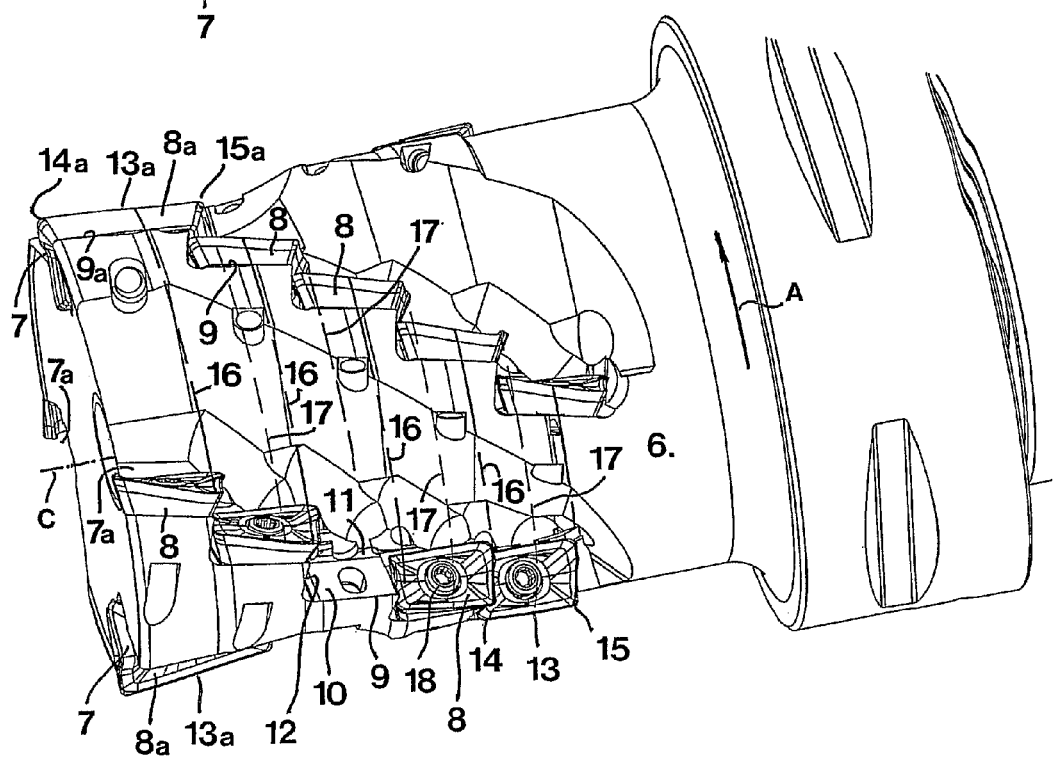

In the drawing:

FIG. 1 is a perspective view of a milling tool equipped with four helix rows of cutting inserts, and FIG. 2 is a partial perspective view of the same tool on an enlarged scale, one of the cutting inserts having been removed with the purpose of exposing an insert pocket.

DETAILED DESCRIPTION OF A PREFERRED EMBODIMENT OF THE INVENTION

In the drawing, a milling tool is shown in the form of a cylindrical cutter, which in the usual way includes a body generally designated 1 and rotatable around a geometrical axis C. In operation, the milling cutter rotates in the direction of the arrow A. A front cutter head 2 is spaced apart from a rear fixing part 3 via a thickened collar 4. Between a front end surface 5 and the collar 4, an envelope surface 6 extends having a rotationally symmetrical basic shape. In the example, said envelope surface 6 is cylindrical, but it may also be of another shape, e.g., conical. Rearward from the end surface 5, a plurality of, more precisely four, flutes 7, 7a run for equally many rows of cutting inserts. Each such flute is generally helical, so far that it follows an imaginary, helix line or path along the envelope surface of the cutter head. In the individual flute, five axially spaced-apart cutting inserts are arranged in the example shown, the majority of which are designated 8. For mounting of said cutting inserts, equally many seats or insert pockets are formed in the flute 7a, one of which is shown in an exposed state at 9. In the example, the individual insert pocket 9 is formed with a plane bottom 10 and a radial support surface 11. However, it is also feasible to use a serration-connecting surface, which makes the particular radial support surface unnecessary. Nearby insert pockets 9 are spaced-apart via shoulder surfaces 12, which are inclined in such a way that nearby cutting inserts partially can overlap each other. The cutting inserts are fixed in the appurtenant insert pockets by means of screws 18.

In the example, the cutting inserts are indexable in two positions by being formed with two alternatively usable cutting edges 13, the opposite ends or corners of which are designated 14, 15. More precisely, each corner 14 constitutes a front corner, located closest to the front end 5, while the second corner 15 forms a rear corner on each cutting edge. As is clearly seen in the two drawing figures, each rear edge corner 15 of an arbitrary cutting insert in the flute 7a is overlapping the front edge corner 14 of the cutting insert being behind in each individual row or flute. In other words the active edges of the cutting inserts arranged in the same flute are partially overlapping each other. The geometrical locus of said overlapping consists of an imaginary, radial plane, which is outlined at 16 and which henceforth is denominated overlapping plane.

As far as the shown cylindrical cutter has been described hitherto, the same is in all essentials previously known. However, in previously known, full effective cylindrical cutters, the different cutting inserts and the appurtenant insert pockets have been similar or equally long. At least all cutting inserts in the same radial set of cutting inserts (four in the example)

have been equally long. This has meant that all rear edge corners 15 in one and the same radial set of cutting inserts and all front edge corners 14 of the cutting inserts in the nearby radial set have been located in the imaginary overlapping plane 16.

Further Description of the General Idea According to the Invention

In the example, when the milling body comprises four flutes that are tangentially spaced-apart, more precisely equidistantly spaced-apart (partition=90°), every second flute is designated 7 and the two other 7a. Thus, the first flutes 7 are located diametrically opposite each other, while the second flutes 7a in turn are diametrically opposite each other. In each second flute 7a, all cutting inserts 8 are similar, implying that they have the same length. In such a way, the radial overlapping planes 16 are located between nearby cutting inserts in said flutes 7a at equally large axial distance from each other.

However, in each one of the two first flutes 7, not all cutting inserts have one and the same length. Thus, the first cutting insert 8a, which is located closest to the front end 5, has a length that deviates from the length of the other cutting inserts 8 in one and the same flute or insert row. These last-mentioned cutting inserts may advantageously be of the same type, i.e., have the same lengths as the cutting inserts 8 in the flutes 7a. In the example shown, said first cutting insert 8a in the individual flute 7 are longer than the other cutting inserts 8 in the same insert row. Because the cutting insert 8a in practice demands full abutment against the appurtenant insert pocket 9a, also the insert pocket 9a is longer than the other insert pockets 9 in one and the same flute 7.

Advantageously—though not necessarily—the cutting insert 8a is substantially 50% longer than the cutting inserts 8. In such a way, the overlapping planes 17 between the nearby cutting inserts in the flutes 7 will be located approximately halfway between the overlapping planes 16 between the cutting inserts 8 in the flutes 7a. This means that, for instance, the overlapping plane 16 positioned closest to the front end 5 is located between the front and rear ends 14a, 15a of the long cutting edges 13a present on the cutting inserts 8a, (the distance of the plane 16 from the end 14a=⅔ of the edge length). Therefore, if a minor misalignment would occur between the mutually overlapping corners 14, 15 in connection with the plane 16 and in such a way give rise to a stripe or irregularity in the machined surface, said irregularity will be eliminated, as the same section of the surface immediately afterwards is run over by the edges 13a of the long cutting inserts 8a.

In an analogous way, the overlapping planes 17 are located between opposite ends of the edges 13 of the cutting inserts 8 in the flutes 7a. In other words, it is guaranteed that each tendency to the emergence of an irregularity as a consequence of misalignments of or shape defects in the cutting inserts is eliminated, because an initiated irregularity is removed substantially immediately by being passed by a cutting edge in the trailing insert row.

By using, in accordance with the invention, cutting inserts having different length in every second flute in the first set of cutting inserts positioned closest to the front end 5, and in such a way mutually displace the remaining overlapping planes in relation to each other, a full effective milling cutter is provided, so far that the active edges of all cutting inserts in the front radial set extend all the way up to a common radial plane adjacent to the front end of the milling body. In such a way, not only good smoothness and precision in the machined surface is guaranteed, but also that the milling cutter can operate at an optimum effect, because all cutting inserts in the different radial sets, i.e., also the front radial set, can be subjected to uniform load.

Although the desired relative displacement of the overlapping planes in the example has been provided by forming the front cutting insert in every second insert row 50% longer than the other cutting inserts in the same row, it is within the scope of the invention also feasible to provide the plane displacement by using a front cutting insert having half the length.

LIST OF REFERENCE DESIGNATIONS

1=milling body
2=cutter head
3=fixing part
4=collar
5=front end surface
6=envelope surface
7, 7a=flutes
8, 8a=cutting inserts
9, 9a=insert pockets
10=insert pocket bottom
11=radial support
12=shoulder
13=cutting edge
14=front corner of cutting edge
15=rear corner of cutting edge
16=overlapping plane
17=overlapping plane
18=fixing screw

The invention claimed is:

1. Milling tool comprising a milling body rotatable around a geometrical axis, said body having an envelope surface extending rearward from a front end, in which body a plurality of tangentially spaced flutes are formed, which separately includes a plurality of axially spaced-apart insert pockets for releasably mounted cutting inserts, the active edges of the cutting inserts of the same flute partially overlapping each other in imaginary, radially extending overlapping planes, wherein a first insert pocket located closest to the front end, together with the appurtenant cutting insert in a first flute, has another length than the other insert pockets and the cutting inserts, respectively, in the same flute in order to axially displace said overlapping planes in relation to the overlapping planes between the cutting inserts in a row of cutting inserts in a second, nearby flute, wherein the body includes an even number of flutes and insert rows, respectively, wherein the front cutting insert in every second flute has another length than the other cutting inserts in the same flute.

2. Milling tool according to claim 1, wherein said first cutting insert in said first flute is longer than the other cutting inserts in the same flute.

3. Milling tool according to claim 2, wherein said other cutting inserts in said first flute are equally long as all cutting inserts in the second flute.

4. Milling tool according to claim 1, wherein the first cutting insert in said first flute has a length that deviates by approximately 50% from the length of the other cutting inserts in the same flute to locate the overlapping planes between the cutting inserts in the first flute approximately halfway between the ends of the edges of the cutting inserts in the second flute.

5. Milling tool according to claim 1, comprising at least four flutes and insert rows.

6. Milling tool according to claim 1, wherein the cutting inserts are arranged to subject each to a uniform load.

7. A milling tool comprising:

a milling body rotatable around a geometrical axis, said milling body including an envelope surface extending rearward from a front end, a plurality of tangentially spaced flutes formed in the milling body, which separately include a plurality of axially spaced-apart insert pockets for releasably mounted cutting inserts, wherein active edges of the cutting inserts of the same flute partially overlap each other in imaginary, radially extending overlapping planes, wherein a first insert pocket located closest to the front end, together with the appurtenant cutting insert in a first flute, has a length different than the other insert pockets and the cutting inserts, respectively, in the same flute, and has a first overlapping plane axially displaced in relation to an overlapping plane between the cutting inserts in a row of cutting inserts in a second, nearby flute, wherein the body includes an even number of flutes and insert rows, respectively, wherein the front cuffing insert in every second flute has another length than the other cutting inserts in the same flute, and wherein the cuffing inserts are subject to a uniform load.

* * * * *